United States Patent
Crowe, Jr. et al.

[11] Patent Number: 5,975,875
[45] Date of Patent: Nov. 2, 1999

[54] BASECURVE MOLD DESIGNS TO MAINTAIN HEMA RING/BASECURVE ADHESION

[75] Inventors: Carl Crowe, Jr.; Victor Lust, both of Jacksonville; Stephen C. Pegram, Gainesville; Robert Phillips, Orange Park; Sanjay Rastogi, Jacksonville; Kornelis Renkema, Jacksonville; Craig W. Walker, Jacksonville, all of Fla.

[73] Assignee: Johnson & Johnson Vision Products, Inc., Jacksonville, Fla.

[21] Appl. No.: 09/037,102

[22] Filed: Mar. 9, 1998

Related U.S. Application Data

[62] Division of application No. 08/794,862, Feb. 5, 1997, abandoned.

[51] Int. Cl.⁶ ........................................ B29D 11/00
[52] U.S. Cl. ..................... 425/215; 249/117; 249/160; 425/808
[58] Field of Search ..................... 425/215, 808; 249/117, 160

[56] References Cited

U.S. PATENT DOCUMENTS

| | | | |
|---|---|---|---|
| 5,036,971 | 8/1991 | Seden et al. | 425/808 |
| 5,158,718 | 10/1992 | Thakrar et al. | 425/808 |
| 5,160,749 | 11/1992 | Fogarty | 425/808 |
| 5,238,388 | 8/1993 | Tsai | 425/808 |
| 5,252,056 | 10/1993 | Horner et al. | 425/808 |
| 5,271,875 | 12/1993 | Appleton et al. | 425/808 |
| 5,542,978 | 8/1996 | Kindt-Larsen et al. | 425/808 |
| 5,882,698 | 3/1999 | Su et al. | 425/808 |

*Primary Examiner*—James P. Mackey

[57] ABSTRACT

Designs for basecurves are disclosed which are designed to promote adhesion of an excess polymer HEMA ring to the basecurve during a demolding operation such that the excess polymer HEMA ring is removed along with the basecurve during the demolding operation. The basecurve mold designs promote and maintain adhesion of an excess polymer HEMA ring to the basecurve in a process for molding cast contact lenses in mold assemblies, each comprising a frontcurve and a spaced basecurve, and wherein a molded lens is formed therebetween. In an embodiment of the invention, the annular area of the basecurve mold can be formed with an annular step which includes projecting teeth positioned therearound which project into the excess polymer HEMA ring.

2 Claims, 6 Drawing Sheets

BASECURVE MOLD DESIGNS TO MAINTAIN HEMA RING/BASECURVE ADHESION

This application is a divisional of application Ser. No. 08/794,862 filed on Feb. 5, 1997, now abandoned.

BACKGROUND OF THE INVENTION

1. Field of the Invention

The present invention provides designs for basecurves which are designed to promote adhesion of an excess polymer HEMA ring to the basecurve during a demolding operation, such that the excess polymer HEMA ring is removed along with the basecurve during the demolding operation.

The present invention relates generally to basecurve mold designs for maintaining adhesion of an excess polymer HEMA ring to a basecurve in a process for molding cast contact lenses in mold assemblies, each comprising a frontcurve and a spaced basecurve, and wherein a molded lens is formed therebetween. The subject invention pertains generally to an arrangement for producing ophthalmic contact lenses in cast contact lens mold assemblies, and provides for the improved removal of an excess polymer HEMA ring with a basecurve mold during a demolding operation.

The present invention is particularly well suited to molded ophthalmic lenses such as hydrogel contact lenses, although it also has applicability to other small, high-precision ophthalmic lenses such as intraocular lenses.

2. Discussion of the Prior Art

As the ophthalmic lens industry has grown, and in particular the industry related to supplying contact lenses which are provided for periodic frequent replacement, the number of contact lenses required to be produced has increased dramatically. This has spurred manufacturers to strive for automated methods and apparatus which are adaptable to automated practices and consistent performance.

It is generally known in the prior art to make ophthalmic lenses, such as soft hydrogel contact lenses, by molding a monomer or monomer mixture in a mold such as one made from polystyrene or polypropylene.

Examples of this prior art can be found in U.S. Pat. Nos. 5,039,459, 4,889,664 and 4,565,348. These patents discuss therein the requirement for a polystyrene mold in which the materials, chemistry and processes are controlled such that the mold portions do not require undue force to separate by sticking to the lens or to each other. In contrast to the above polystyrene molds, another example is the use of polypropylene or polyethylene molds as described in U.S. Pat. No. 4,121,896.

The mold assembly to mold an ophthalmic contact lens typically includes a lower concave mold portion referred to as a frontcurve and an upper convex mold portion referred to as a basecurve. The concave surface of the lower frontcurve and the convex surface of the upper basecurve define therebetween a mold cavity for a contact lens.

A particular problem in the prior art is that the frontcurve and basecurve molds are usually surrounded by a flange, and the monomer or monomer mixture is supplied in excess to the concave frontcurve mold prior to the assembly of the molds. As the molds are placed together, defining the lens and forming an edge, the excess monomer or monomer mixture is expelled from the mold cavity and rests on or between the flange of one or both mold portions. Upon polymerization, this excess material forms an annular ring around the mold assembly which resists separation of the mold portions during a demolding operation. In such contact lens manufacturing processes, lens defects such as chips and tears as well as missing lenses are believed to result, in part, from difficulties in the demolding operation.

In the demolding process, it is desirable that the excess polymer HEMA ring remain adhered to the basecurve for removal of the excess polymer HEMA ring with the basecurve when the basecurve is demolded and removed, leaving only the cast contact lens in the frontcurve.

SUMMARY OF THE INVENTION

Accordingly, it is a primary object of the present invention to provide designs for basecurves which are designed to promote adhesion of an excess polymer HEMA ring to the basecurve during a demolding operation, such that the excess polymer HEMA ring is removed along with the basecurve during the demolding operation.

A further object of the subject invention is the provision of an improved arrangement for producing cast contact lenses in mold assemblies in which the basecurve molds can be easily and repeatedly separated from the frontcurve molds with the excess polymer HEMA ring adhered thereto and without damaging the lenses formed therebetween, to thereby enhance the production of defect-free contact lenses, and minimize tearing of the lens and breakage of the lens mold parts.

The present invention basically discloses and teaches the placement of a mechanical finish or feature on the basecurve, which assists in adhering the excess polymer HEMA ring to the basecurve. The mechanical finish or feature is placed on the basecurve in the region where the excess polymer HEMA ring is normally formed.

In accordance with the teachings herein, the present invention provides an arrangement for molding a cast ophthalmic lens in a mold assembly, comprising a frontcurve mold which has a central lens mold section with a surrounding flange, a corresponding basecurve mold which has a central lens mold section with a surrounding flange, and wherein a molded ophthalmic lens is formed between the frontcurve and basecurve molds. An excess polymer HEMA ring is formed around the central mold section during the molding process, and the basecurve mold includes an annular area adjacent to the excess polymer HEMA ring which is formed with a surface contour to increase the surface area of the basecurve mold in contact with the excess polymer HEMA ring and geometrically enhance the meniscus effect of the HEMA ring to rise up the surface of the base curve. This increases the adhesion of the excess polymer HEMA ring to the basecurve mold such that the excess polymer HEMA ring is removed with the basecurve mold during demolding of the lens mold assembly.

In greater detail, in one embodiment the annular area of the basecurve mold is formed with laser machining marks therein, formed by laser machining a corresponding annular area in a master mold used to cast the basecurve molds. In a second embodiment the annular area of the basecurve mold is formed with electrical discharge machine marks therein, formed by electrical discharge machining a corresponding annular area in a master mold used to cast the basecurve molds. In a further embodiment, the annular area of the basecurve mold is formed with projecting teeth which project into the excess polymer HEMA ring. In an alternate embodiment, the annular area of the basecurve mold is formed with an annular step which contacts the excess polymer HEMA ring. Moreover, the annular step can include a plurality of projecting teeth therearound which project into the excess polymer HEMA ring. In alternative embodiments, the annular area of the basecurve mold can define a spoked design or an edgecut design.

BRIEF DESCRIPTION OF THE DRAWINGS

The foregoing objects and advantages of the present invention for basecurve mold designs to maintain HEMA ring/basecurve adhesion may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWING

Figure 1:
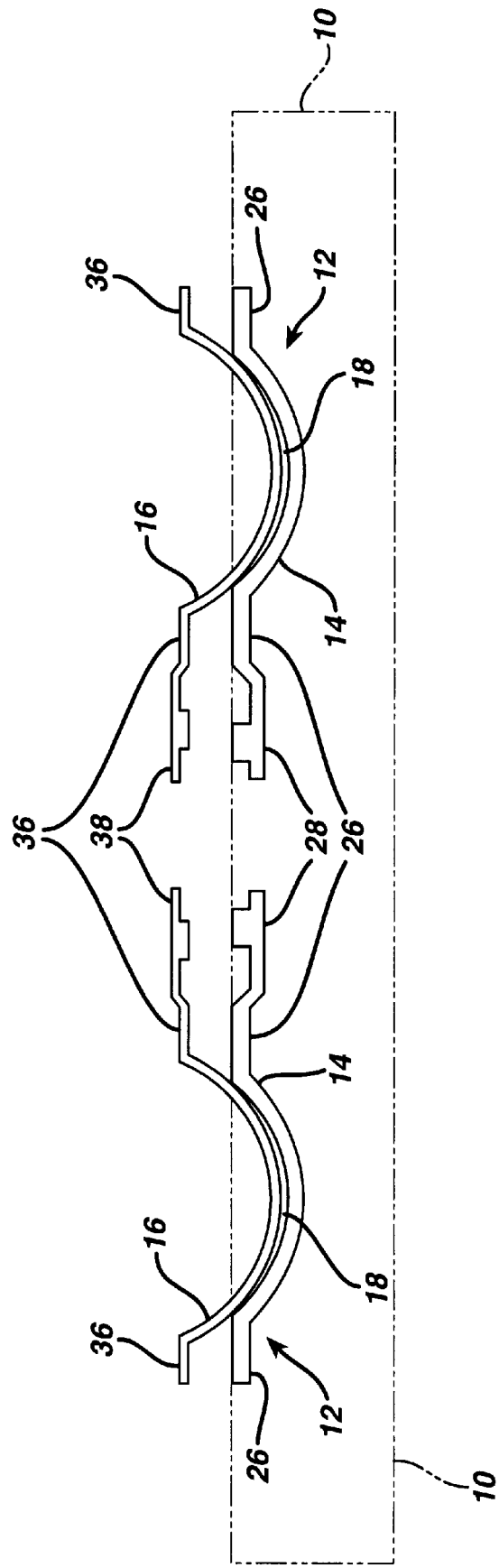
FIG. 1 illustrates a front elevational view of a support pallet which holds therein a two by four array of contact lens mold assemblies, each of which consists of a lower frontcurve mold and an upper basecurve mold, defining therebetween a mold cavity for a contact lens.
Figure 2:
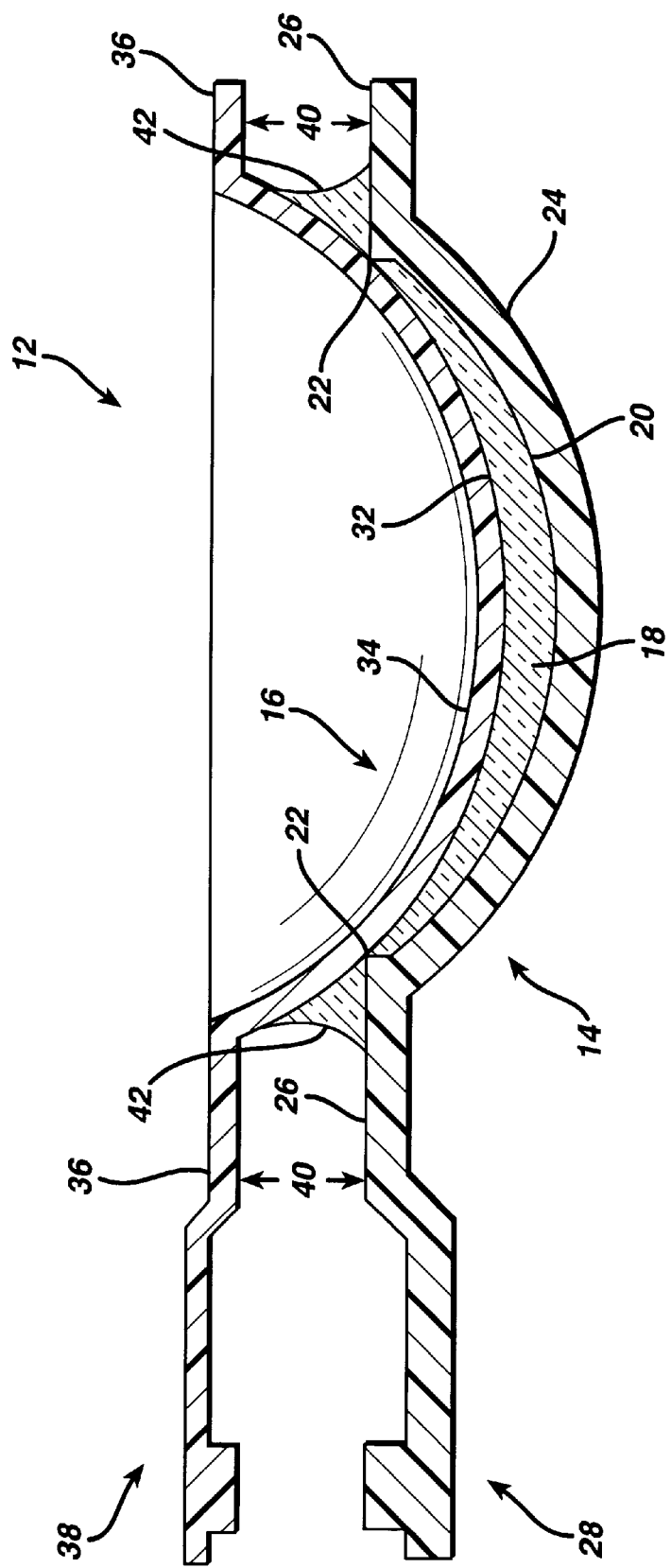
FIG. 2 is an enlarged side elevational and sectional view of a typical prior art contact lens mold assembly, illustrating details of construction of the lower frontcurve mold and the upper basecurve mold.

Referring to the drawings in detail, and in particular initially to FIGS. 1 and 2, FIG. 1 illustrates a front elevational view of a support pallet 10 which supports thereon an array, typically a two by four array, of contact lens mold assemblies 12, one of which is illustrated in further detail in FIG. 2.

FIG. 2 is an enlarged side elevational and sectional view of one contact lens mold assembly 12 which consists of a lower frontcurve mold 14 and an upper basecurve mold 16, which define therebetween a mold cavity for a contact lens 18.

The frontcurve and basecurve mold halves 14 and 16 are preferably formed of polystyrene but could be any suitable thermoplastic polymer which is sufficiently transparent to ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and having minimal shrinkage during cooling.

The frontcurve mold half 14 defines a central curved section with an optical quality concave surface 20, which has a circular circumferential knife edge 22 extending therearound. The knife edge 22 is normally desirable to form a sharp and uniform plastic radius parting line (edge) for the subsequently molded soft contact lens 18. A generally parallel convex surface 24 is spaced from the concave surface 20, and an annular essentially uniplanar flange 26 is formed extending radially outwardly from the surfaces 20 and 24. The concave surface 20, has the dimensions of the frontcurve (power curve) of a contact lens to be produced by the mold assembly, and is sufficiently smooth such that the surface of a contact-lens formed by polymerization of a polymerizable composition in contact with the surface is of optically acceptable quality. The frontcurve mold half is designed with a thinness, typically 0.8 mm, and rigidity effective to transmit heat therethrough rapidly and to withstand prying forces applied to separate the mold half from the mold assembly during a demolding operation. The frontcurve mold half 14 further defines a generally triangular tab 28, integral with the flange 26 which projects from one side of the flange. Tab 28 is essentially uniplanar and extends to an injection hot tip which supplies molten thermoplastic to form the frontcurve mold half.

The basecurve mold half 16 defines a central curved section with an optical quality convex surface 32, a generally parallel concave surface 34 spaced from the convex surface 32, and an annular essentially uniplanar flange 36 formed-extending radially outwardly from the surfaces 32 and 34. The convex surface 32 has the dimensions of the rear curve (which rests upon the cornea of the eye) of a contact lens to be produced by the basecurve mold half, and is sufficiently smooth such that the surface of a contact lens formed by polymerization of a polymerizable composition in contact with the surface is of optically acceptable quality. The basecurve mold half is designed with a thinness, typically 0.6 mm, and rigidity effective to transmit heat therethrough rapidly and to withstand prying forces applied to separate the mold half from the mold assembly during demolding. The basecurve mold half 16 also defines a generally triangular tab 38, similar to the triangular tab 28, integral with the flange which projects from one side of the flange. The tab 38 extends to an injection hot tip which supplies molten thermoplastic to form the basecurve mold half.

During the process of molding a contact lens in prior art processes, an excess amount of polymer or polymer mixture is initially deposited in a frontcurve mold, and then a basecurve mold is placed over the frontcurve mold and pressed thereagainst. This results in excessive polymer in the mold cavity being displaced and discharged therefrom and forming an excess polymer ring 42 outside of the knife edge 22.

The flanges 26 and 36 are designed to assist in demolding and part handling, and also protect the optical surfaces and the knife edge. The geometry of the triangular tabs 28 and 38 serves an additional function in straightening and orienting the assembled frontcurve/basecurve assembly 12 prior to demolding. When a frontcurve mold half or curve 14 is assembled with a basecurve mold half or curve 16, a gap 40 is formed between the two spaced flanges and projecting tabs which is important for demolding. The gap between the tabs is preferably in the range of 1.0 mm–3.0 mm, and is required to assist in the demolding operation.

Referring to FIGS. 1 and 2, the contact lens mold assemblies 12 are supported in the pallet 10 with the annular flanges 26 and tabs 28 of the frontcurve mold 14 recessed slightly below the upper surface of the pallet 10. The annular flanges 36 and tabs 38 of the basecurve mold 16 are raised above the upper surface of the pallet, to allow a mechanical separating member to be inserted between the spaced flanges 26, 36 of the frontcurve and basecurve.

Figure 3:
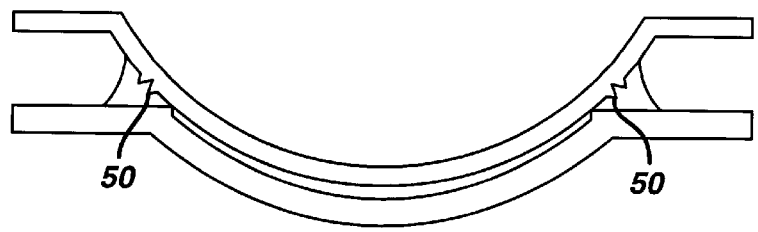
FIG. 3 is a schematic illustration of a mold assembly in which the basecurve mold is laser machined to promote adhesion of an excess polymer HEMA ring to the basecurve during a demolding operation.

FIG. 3 is a schematic illustration of a mold assembly in which the basecurve mold has a roughened surface in an annular area 50 therearound in which the excess polymer HEMA is normally formed to promote adhesion of the excess polymer ring to the basecurve during a demolding operation. The roughened annular area 50 in the basecurve mold is formed by laser machining a roughened annular area in the master metal mold which is used to cast the basecurve molds. The roughened annular area can be formed by one or more laser machined rings in the master metal mold, formed by ablating metal in the rings by a laser beam which is scanned therearound.

Figure 4:
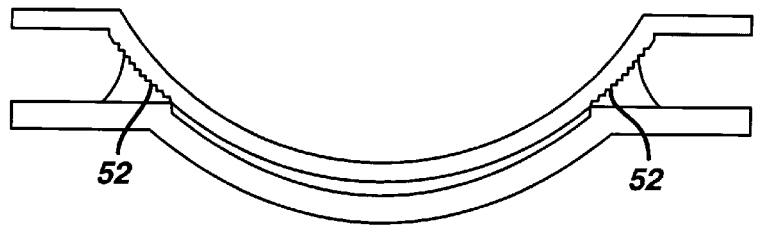
FIG. 4 is a schematic illustration of a mold assembly in which the basecurve mold is Electrical Discharge Machined (EDM) to promote adhesion of an excess polymer HEMA ring to the EDM surface of the basecurve during a demolding operation.

FIG. 4 is a schematic illustration of a mold assembly in which the master metal mold used to cast the basecurve mold has been Electrical Discharge Machined (EDM)in an annular area 52 to promote adhesion of an excess polymer HEMA ring to the EDM surface of the basecurve during a demolding operation.

Figure 5:
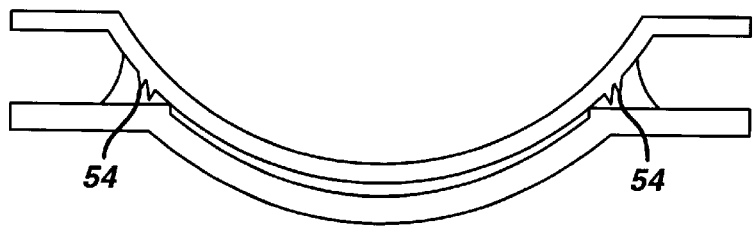
FIG. 5 is a schematic illustration of a mold assembly in which the basecurve mold includes a sharktooth design surface, to promote adhesion of an excess polymer HEMA ring to the basecurve during a demolding operation.

FIG. 5 is a schematic illustration of a mold assembly in which the basecurve mold includes a sharktooth 54 design in the surface in an annular area therearound, to promote adhesion of an excess polymer HEMA ring to the basecurve during a demolding operation.

Figure 6:
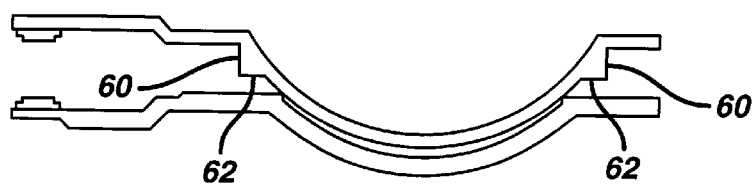
FIG. 6 is a schematic illustration of a mold assembly in which the basecurve mold includes an annular step to promote adhesion of an excess polymer HEMA ring to the basecurve during a demolding operation.

FIG. 6 is a schematic illustration of a mold assembly in which the basecurve mold includes an annular step 60 (having a cross section approximating a triangle) formed therearound to provide an increased annular surface area 62 on the basecurve mold which contacts the excess polymer HEMA ring to promote adhesion of the excess polymer HEMA ring to the basecurve during a demolding operation.

Figure 7:
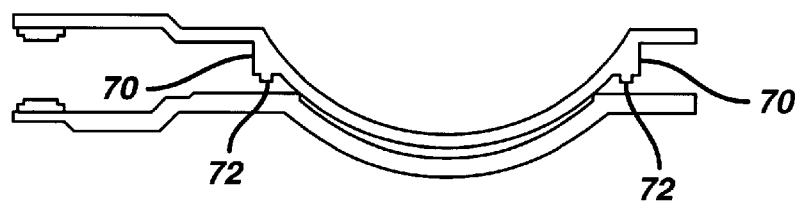
FIG. 7 illustrates a mold assembly similar to that illustrated in FIG. 6, wherein the annular step includes an annular ring of projecting teeth to promote adhesion of an excessive polymer HEMA ring to the basecurve during a demolding operation.

FIG. 7 illustrates a mold assembly having an annular step 70 similar to that illustrated in FIG. 6, wherein the annular step 70 includes an annular ring of projecting teeth 72 to promote adhesion of an excessive polymer HEMA ring to the basecurve during a demolding operation.

Figure 8:
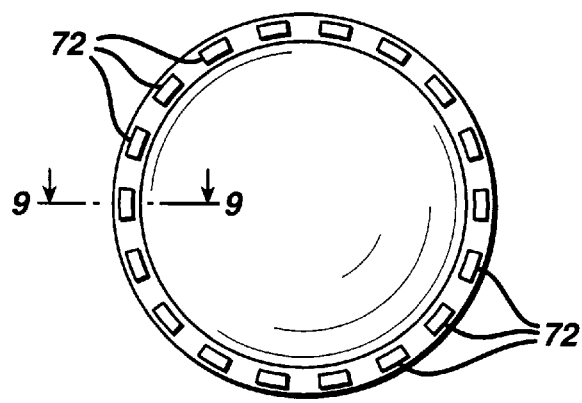
FIGS. 8 and 9 are respectively a bottom plan view of the basecurve of FIG. 7, and an enlarged view of a cross section taken along arrows 9—9 in FIG. 8.
Figure 9:
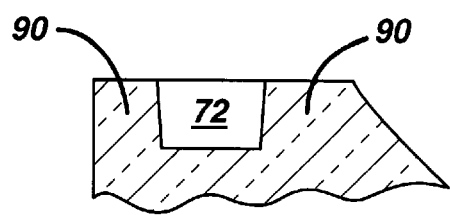

FIGS. 8 and 9 are respectively a bottom plan view of the annular step 70 on the basecurve of FIG. 7, and an enlarged cross sectional view taken along arrows 9—9 in FIG. 8. In FIG. 9, the cross sectioned area 90 surrounding the tooth 72 can be envisioned as the excess polymer HEMA ring formed around the projecting tooth.

Figure 10:
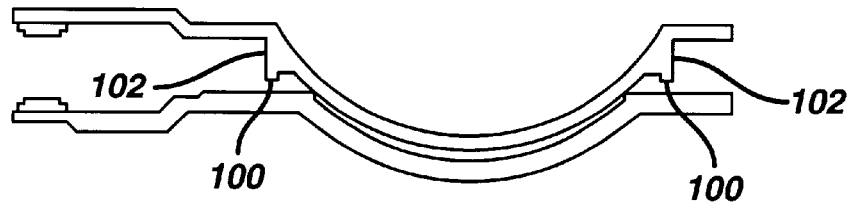
FIG. 10 illustrates a mold assembly similar to that illustrated in FIGS. 7–9, wherein the annular step includes an annular ring of projecting teeth along the radial outer edge thereof to promote adhesion of an excessive polymer HEMA ring to the basecurve during a demolding operation.

FIG. 10 illustrates a mold assembly similar to that illustrated in FIGS. 7–9, wherein the annular ring of projecting teeth 100 are displaced radially outwardly to the outer radial edge of the annular step 102 to promote adhesion of an excessive polymer HEMA ring to the basecurve during a demolding operation.

Figure 11:
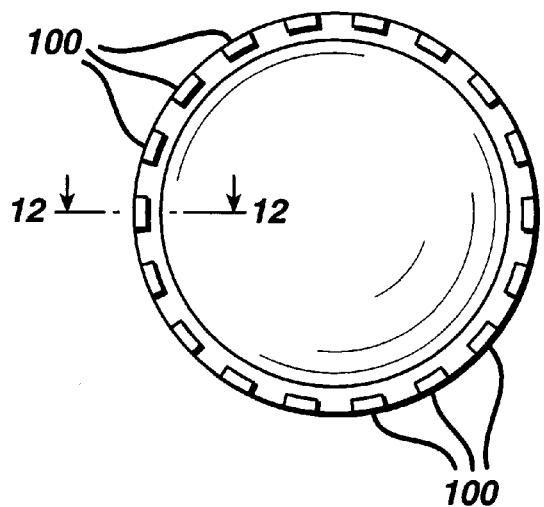
FIGS. 11 and 12 are respectively a bottom plan view of the basecurve of FIG. 10, and an enlarged view of a cross section taken along arrows 12—12 in FIG. 11.
Figure 12:
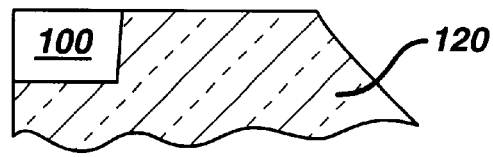
Figure 13:
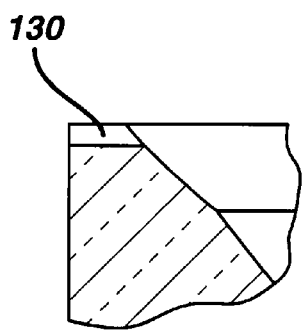
FIGS. 13–17 are respectively cross sectional views, similar to FIGS. 9 and 12, of different embodiments of a basecurve surface designed to promote adhesion of an excess polymer HEMA ring to the basecurve during a demolding operation, and showing respectively a spoke design, a tooth design, an edge cut design, a laser design, and an EDM design.
Figure 14:
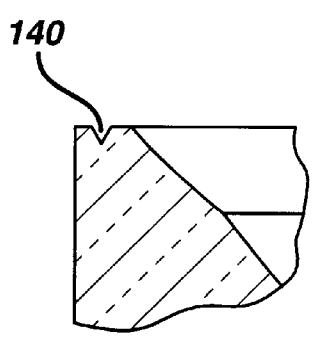
Figure 15:
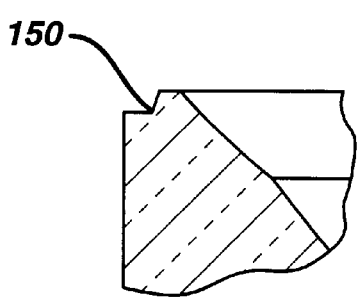
Figure 16:
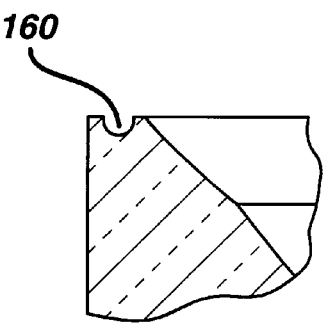
Figure 17:
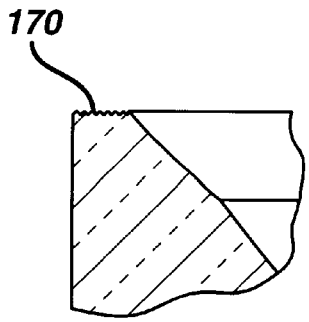

FIGS. 11 and 12 are respectively a bottom plan view of the basecurve of FIG. 10, and an enlarged view of a cross section taken along arrows 12—12 in FIG. 11. Again, in FIG. 12, the cross sectional area 120 surrounding the tooth 100 can be envisioned as the excess polymer HEMA ring formed around the projecting tooth.

FIGS. 13–17 are respectively cross sectional views of different embodiments of a basecurve surface designed to promote adhesion of an excess polymer HEMA ring to the basecurve during a demolding operation. In the embodiments of FIG. 13–17, the cross sectional areas can be envisioned as the excess polymer HEMA ring. Each of these embodiments includes an annular step, similar to that of FIG. 6, in which is formed respectively a spoke design 130, a tooth design 140, an edge cut design 150, a laser machined design 160, and an EDM design 170.

While several embodiments and variations of the present invention for basecurve mold designs to maintain HEMA ring/basecurve adhesion are described in detail herein, it should be apparent that the disclosure and teachings of the present invention will suggest many alternative designs to those skilled in the art.

What is claimed is:

1. An arrangement for molding a cast ophthalmic lens in a mold assembly, comprising a frontcurve mold which has a central lens mold section with a surrounding flange, a corresponding basecurve mold which has a central lens mold section with a surrounding flange, wherein a molded ophthalmic lens is formed between the frontcurve and basecurve molds, and an excess polymer HEMA ring is formed around the central mold sections during molding of said ophthalmic lens, and the basecurve mold includes an annular area between said surrounding flange of said basecurve mold and said central lens mold section of said basecurve mold, said annular area is formed with a surface contour to increase the surface area of the basecurve mold in contact with the excess polymer HEMA ring to increase the adhesion of the excess polymer HEMA ring to the basecurve mold such that the excess polymer HEMA ring is removed with the basecurve mold during demolding of the lens mold assembly, wherein said annular area of the basecurve mold is formed with an annular step, said annular step includes a plurality of projecting teeth formed around said annular step which project into the excess polymer HEMA ring.

2. The arrangement for molding a cast ophthalmic lens in a mold assembly as claimed in claim 1, wherein said annular step includes an outer radial edge, said projecting teeth are displaced radially outwardly to said outer radial edge.

\* \* \* \* \*